US010025387B2

(12) United States Patent
Keller et al.

(10) Patent No.: US 10,025,387 B2
(45) Date of Patent: Jul. 17, 2018

(54) RESISTING USER MOVEMENT USING ACTUATED TENDONS

(71) Applicant: Oculus VR, LLC, Menlo Park, CA (US)

(72) Inventors: Sean Jason Keller, Kirkland, WA (US); Tristan Thomas Trutna, Seattle, WA (US); Garett Andrew Ochs, Seattle, WA (US); Selso Luanava, Woodinville, WA (US); Nicholas Roy Corson, Mukilteo, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 15/372,336

(22) Filed: Dec. 7, 2016

(65) Prior Publication Data
US 2017/0160807 A1     Jun. 8, 2017

Related U.S. Application Data

(60) Provisional application No. 62/264,630, filed on Dec. 8, 2015.

(51) Int. Cl.
| G06F 3/033 | (2013.01) |
| G06F 3/01 | (2006.01) |
| A41D 19/00 | (2006.01) |

(52) U.S. Cl.
CPC .............. *G06F 3/016* (2013.01); *G06F 3/014* (2013.01); *A41D 19/0024* (2013.01)

(58) Field of Classification Search
CPC .......... G06F 3/016; G06F 3/017; G06F 3/011; G06F 3/014
See application file for complete search history.

(56) References Cited

U.S. PATENT DOCUMENTS

| 6,088,017 | A | * | 7/2000 | Tremblay | ................ | G06F 3/011 |
| | | | | | | 345/156 |
| 6,304,840 | B1 | * | 10/2001 | Vance | ..................... | G06F 3/014 |
| | | | | | | 703/21 |
| 7,042,438 | B2 | * | 5/2006 | McRae | ................... | A63F 13/06 |
| | | | | | | 345/156 |
| 7,472,047 | B2 | * | 12/2008 | Kramer | ................... | G06T 19/20 |
| | | | | | | 703/6 |
| 8,519,999 | B2 | * | 8/2013 | Visser | ..................... | G06T 15/08 |
| | | | | | | 345/419 |

(Continued)

*Primary Examiner* — Vijay Shankar
(74) *Attorney, Agent, or Firm* — Fenwick & West LLP

(57) ABSTRACT

An input interface configured to be worn on a portion of a user's body includes tendons coupled to various sections of the garment. A tendon includes one or more activation mechanisms that, when activated, prevent or restrict a particular range of motion. The tendon may include a tendon web that controls multiple portions of the user's body with an activation mechanism. The tendon may connect to the garment through a textile mesh that distributes force over a wider area of the user's skin. An activation mechanism may apply force to the textile mesh to modify the stiffness of the textile mesh or to modify the pressure applied by the textile mesh. The tendon may be a wire or have a form with variable width. The activation mechanism may be a solenoid using a permanent magnet, which may have multiple alternating magnetic poles.

20 Claims, 9 Drawing Sheets

(56) References Cited

U.S. PATENT DOCUMENTS

| | | | |
|---|---|---|---|
| 8,593,402 B2 * | 11/2013 | Stinson, III | G06F 3/0304 345/157 |
| 2008/0094351 A1 * | 4/2008 | Nogami | G06F 3/016 345/156 |

* cited by examiner

RESISTING USER MOVEMENT USING ACTUATED TENDONS

CROSS-REFERENCE TO RELATED APPLICATION

This application claims the benefit of U.S. Provisional Application No. 62/264,630, filed Dec. 8, 2015, which is incorporated by reference in its entirety

BACKGROUND

Virtual reality (VR) systems typically provide multiple forms of sensory output, such as a VR headset and headphones, which operate together to create the illusion that a user is immersed in a virtual world. A VR system can also include an input device such as a VR glove that detects position, acceleration, orientation, and other information associated with the user's hand and provides the information as input. The input can then be used to move a corresponding item in the virtual world (e.g., a hand or other appendage belonging to a character in the virtual world) when the glove detects movement of the user's hand in the real world. A VR glove can also be used to facilitate interactions with other objects in the virtual world. For example, the VR system can allow the user to use the glove to manipulate virtual objects by touching them, picking them up, and moving them.

SUMMARY

To further improve the illusion that a user is manipulating virtual objects, an input interface of a virtual reality (VR) system includes a haptic feedback mechanism resisting movement by one or more portions of a user's body. For example, a glove includes a tendon controlled by an actuator, which tensions the tendon to apply force to portions of the glove attached to the tendon. As another example, the actuator tensions the tendon to resist a force applied to portions of the glove attached to the tendon. In various embodiments, the actuator tensions the tendon based on instructions or information received from a console, or other component, of the VR system that provides content to the user. The tendon may apply force to resist a user movement (e.g., grabbing a virtual marshmallow), to cause a user movement (e.g., flattening fingers pushed against a virtual wall), or to apply isometric force (e.g., torqueing the hand downward at the wrist while the user holds a virtual rock). In one mechanism, the glove includes a tendon web connected to an actuator to reduce the number of actuators while selectively distributing forces applied to the glove. Using the tendon web, the actuator may distribute force to multiple digits. The tendons are connected to rigid elements on the glove, or the tendons are connected to the glove through textile meshes to reduce stress concentrations where the tendon is connected to the glove. The textile mesh may include control wires that modify the stiffness of the textile mesh by applying a force to the integrated textile mesh. The tendons may have variable thickness or widths to increase comfort for the user. For example, the tendons are thinner at the user's joints to reduce rigidity along axes of movement.

The tendons may be actuated using a solenoid that applies a variable force by varying an electrical current through a helical wire. To improve position sensing and control, the actuator may include opposing magnetic poles stacked along the direction of the tendon. These magnetic poles discretize the position of the tendon, acting as a magnetic detent, which simplifies position control and facilitates measurement of the tendon's position.

The haptic feedback mechanism may be worn on another portion of the body. For example, the haptic feedback mechanism is a sleeve wearable around a joint such as a wrist, elbow, or knee. Using tendons across the joint, the sleeve may torque the joint to simulate weight of a virtual object. The sleeve may vary the orientation of the applied torque according to an orientation of the joint tracked by the VR system. For example, as a user lifts a heavy virtual object from the user's waist to the user's shoulder, tendons around the user's wrist apply a downward torque around the user's wrist to simulate gravitational force on the virtual object. The sleeve applies torque in in an orientation consistent with gravity according to the joint's orientation relative to gravity.

Although discussed in terms of VR systems, devices described herein can be used with augmented reality (AR) systems and any other feedback/control interfaces designed to give users a more immersive experience within a computing environment. The system can be used to simulate virtual objects as well as modify the perceived properties of real objects that are tracked and manipulated in an AR context. For example, a tendon glove may apply torques to resist closing of the user's hand when grasping a real rubber ball to increase the perceived stiffness of the rubber ball.

DETAILED DESCRIPTION

System Overview

Figure 1:
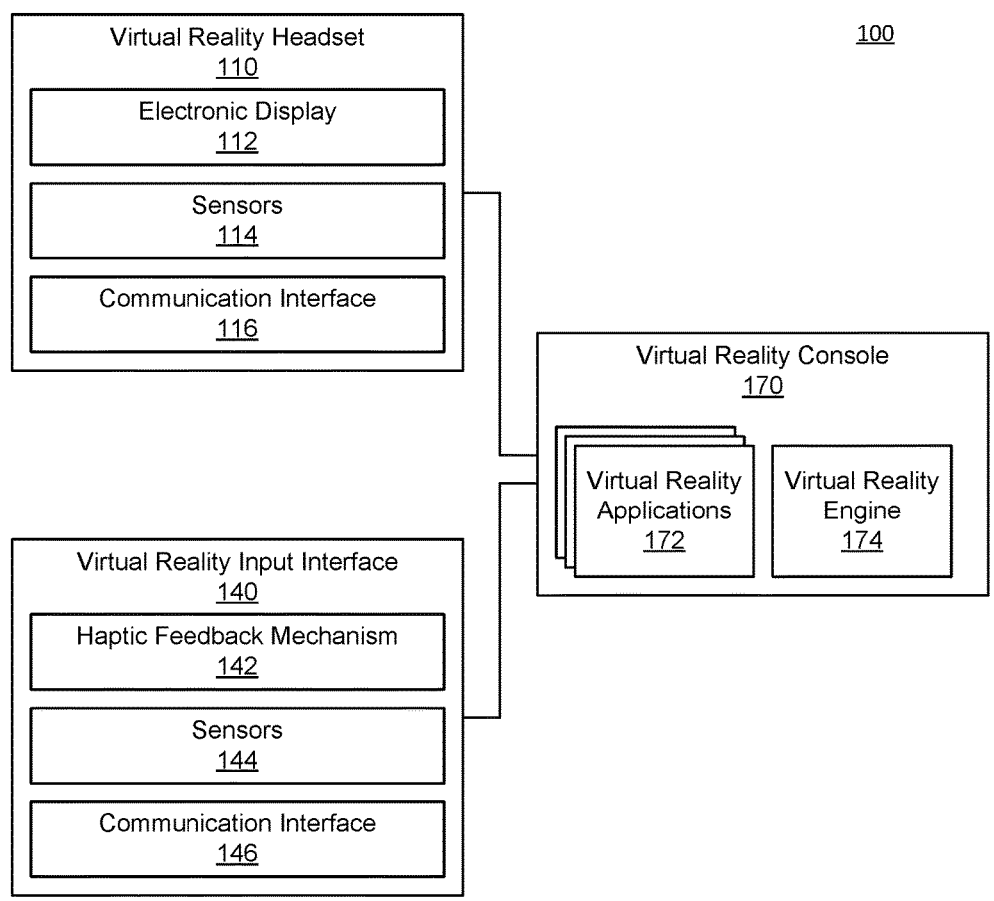
FIG. 1 is a block diagram of a virtual reality system, in accordance with an embodiment.

FIG. 1 is a block diagram of a virtual reality (VR) system environment 100 in which a VR input interface 140 operates. The system environment 100 shown in FIG. 1 comprises a VR headset 110 and a VR input interface 140 that are both coupled to a VR console 170. While FIG. 1 shows an example system 100 including one VR headset 110 and one VR input interface 140, in other embodiments any number of these components may be included in the system 100. For example, the system 100 may include two VR input interfaces 140 (e.g., one for each hand) that are worn by the same user. As another example, the system 100 may include multiple VR input interfaces 140 intended to be worn by multiple users, with each VR input interface 140 or each pair of VR input interfaces 140 associated with a different VR headset 110. In alternative configurations, different and/or additional components may be included in the system environment 100.

The VR headset 110 is a head-mounted display that presents media to a user. Examples of media presented by the VR headset 110 include images, video, audio, or some combination thereof. In some embodiments, audio is presented via an external device (e.g., speakers and/or headphones) that receives audio information from the VR headset 110, the VR console 170, or both, and presents audio data based on the audio information.

The VR headset 110 includes an electronic display 112, sensors 114, and a communication interface 116. The electronic display 112 displays images to the user in accordance with data received from the VR console 170. In various embodiments, the electronic display 112 may comprise a single electronic display 112 or multiple electronic displays 112 (e.g., one display for each eye of a user).

The sensors 114 include one or more hardware devices that detect spatial and motion information about the VR headset 110. Spatial and motion information can include information about the position, orientation, velocity, rotation, and acceleration of the VR headset 110. For example, the sensors 114 may include a gyroscope that detects rotation of the user's head while the user is wearing the VR headset 110. This rotation information can then be used (e.g., by the VR engine 174) to adjust the images displayed on the electronic display 112.

The communication interface 116 enables input and output to the VR console 170. In some embodiments, the communication interface 116 is a single communication channel, such as HDMI, USB, VGA, DVI, or DISPLAYPORT™. In other embodiments, the communication interface 116 includes several distinct communication channels operating together or independently. In one embodiment, the communication interface 116 includes wireless connections for sending data collected by the sensors 114 from the VR headset 110 to the VR console 170 but also includes a wired HDMI connection or DVI connection that receives audio/visual data to be rendered on the electronic display 112.

The virtual reality input interface 140 is a garment configured to be worn on a portion of a user's body, such as the user's hand. The VR input interface 140 collects information about the portion of the user's body that can be used as input for virtual reality applications 172 executing on the VR console 170. In the illustrated embodiment, the VR input interface 140 includes a haptic feedback mechanism 142, sensors 144, and a communication interface 146. The VR input interface 140 may include additional components that are not shown in FIG. 1, such as a power source (e.g., an integrated battery, a connection to an external power source, a container containing compressed air, or some combination thereof).

The haptic feedback mechanism 142 provides haptic feedback to the user by applying forces to a portion of the user's body, possibly inducing movement in a particular way or in a particular direction or preventing the portion of the user's body from moving in certain directions or in certain ways. To apply a load to a portion of the user's body or apply torque to a joint in the user's body, the haptic feedback mechanism 142 includes a tendon system to apply distributed force to the garment. Various embodiments of the haptic feedback mechanism 142 are described in conjunction with FIGS. 2-9B.

The sensors 144 include one or more hardware devices that detect spatial and motion information about the VR input interface 140. Spatial and motion information can include information about the position, orientation, velocity, rotation, and acceleration of the VR input interface 140 or any subdivisions of the VR input interface 140. For example, if the VR input interface 140 is a glove, sensors 144 identify positions and orientations of various portions of the glove, such as the fingers, fingertips, knuckles, palm, or wrist.

The communication interface 146 enables input and output to the VR console 170. In some embodiments, the communication interface 146 is a single communication channel, such as USB. In other embodiments, the communication interface 146 includes several distinct communication channels operating together or independently. For example, the communication interface 146 may include separate communication channels for receiving control signals for the haptic feedback mechanism 142 and sending data from the sensors 144 to the VR console 170. The one or more communication channels of the communication interface 146 can be implemented as wired or wireless connections.

The VR console 170 is a computing device that executes virtual reality applications to process input data from the sensors 114 and 144 on the VR headset 110 and VR input interface 140 and provide output data for the electronic display 112 on the VR headset 110 and the haptic feedback mechanism 142 on the VR input interface 140. Additionally, the VR console 170 provides data or instructions to the VR headset 110 or to the haptic feedback mechanism 142 to provide visual or tactile feedback or content to a user. The VR console 170 may be integrated with the VR headset 110 or the VR input interface 140. The VR console 170 can be implemented as any kind of computing device, such as an integrated system-on-a-chip, a microcontroller, a desktop or laptop computer, a server computer, a tablet, a smart phone, or other mobile device. Thus, the VR console 170 includes that includes components common to typical computing devices, such as a processor, random access memory, a storage device, a network interface, an I/O interface, and the like.

The processor may be or include one or more graphics processing units (GPUs), microprocessors, or application specific integrated circuits (ASICs). The memory may be or include RAM, ROM, DRAM, SRAM, and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk, or long term storage of data or instructions in the computing device. The storage device may take the form of a magnetic or solid state disk, tape, CD, DVD, or other reasonably high capacity addressable or serial storage medium. Multiple storage devices may be provided or be available to the computing device. Some of these storage devices may be external to the computing device, such as network storage or cloud-based storage. The network interface includes an interface to a network and can be implemented as either a wired or wireless interface. The I/O interface interfaces the processor to peripherals (not shown) such as, depending upon the computing device, sensors, displays, cameras, color sensors, microphones, keyboards and USB devices.

In the example shown in FIG. 1, the VR console 170 further includes VR applications 172 and a virtual reality (VR) engine 174. In some embodiments, the VR applications 172 and the VR engine 174 are implemented as software modules that are stored on the storage device and executed by the processor. Some embodiments of the VR console 170 include additional or different components than those described in conjunction with FIG. 1. Similarly, the functions further described below may be distributed among components of the VR console 170 in a different manner than is described here.

Each VR application 172 is a group of instructions that, when executed by a processor, generates virtual reality content for presentation to the user. A VR application 172 may generate VR content in response to inputs received from the user via movement of the VR headset 110 or the VR input interface 140. Examples of VR applications 172 include gaming applications, conferencing applications, video playback applications, augmented reality application, or other suitable applications.

The VR engine 174 is a software module that allows VR applications 172 to operate in conjunction with the VR headset 110 and VR input interface 140. In some embodiments, the VR engine 174 receives information from sensors 114 on the VR headset 110 and provides the information to a VR application 172. Based on the received information, the VR engine 174 determines media content to provide to the VR headset 110 for presentation to the user via the electronic display 112 and/or haptic feedback to provide to the VR input interface 140 to provide to the user via the haptic feedback mechanism. For example, if the VR engine 174 receives information from the sensors 114 on the VR headset 110 indicating that the user has looked to the left, the VR engine 174 generates content for the VR headset 110 that mirrors the user's movement in a virtual environment.

Similarly, in some embodiments the VR engine 174 receives information from the sensors 144 on the VR input interface 140 and provides the information to a VR application 172. The VR application 172 can use the information to perform an action within the virtual world of the VR application 172. For example, if the VR engine 174 receives information from the sensors 144 that the user has closed his fingers around a position corresponding to a coffee mug in the virtual environment and raised his hand, a simulated hand in the VR application 172 picks up the virtual coffee mug and lifts it to a corresponding height.

The VR engine 174 may also provide feedback to the user that the action was performed. The provided feedback may be visual via the electronic display 112 in the VR headset 110 (e.g., displaying the simulated hand as it picks up and lifts the virtual coffee mug) or haptic feedback via the haptic feedback mechanism 142 in the VR input interface 140 (e.g., preventing the user's finger's from curling past a certain point to simulate the sensation of touching a solid coffee mug).

Haptic Feedback Using Tendons

Figure 2:
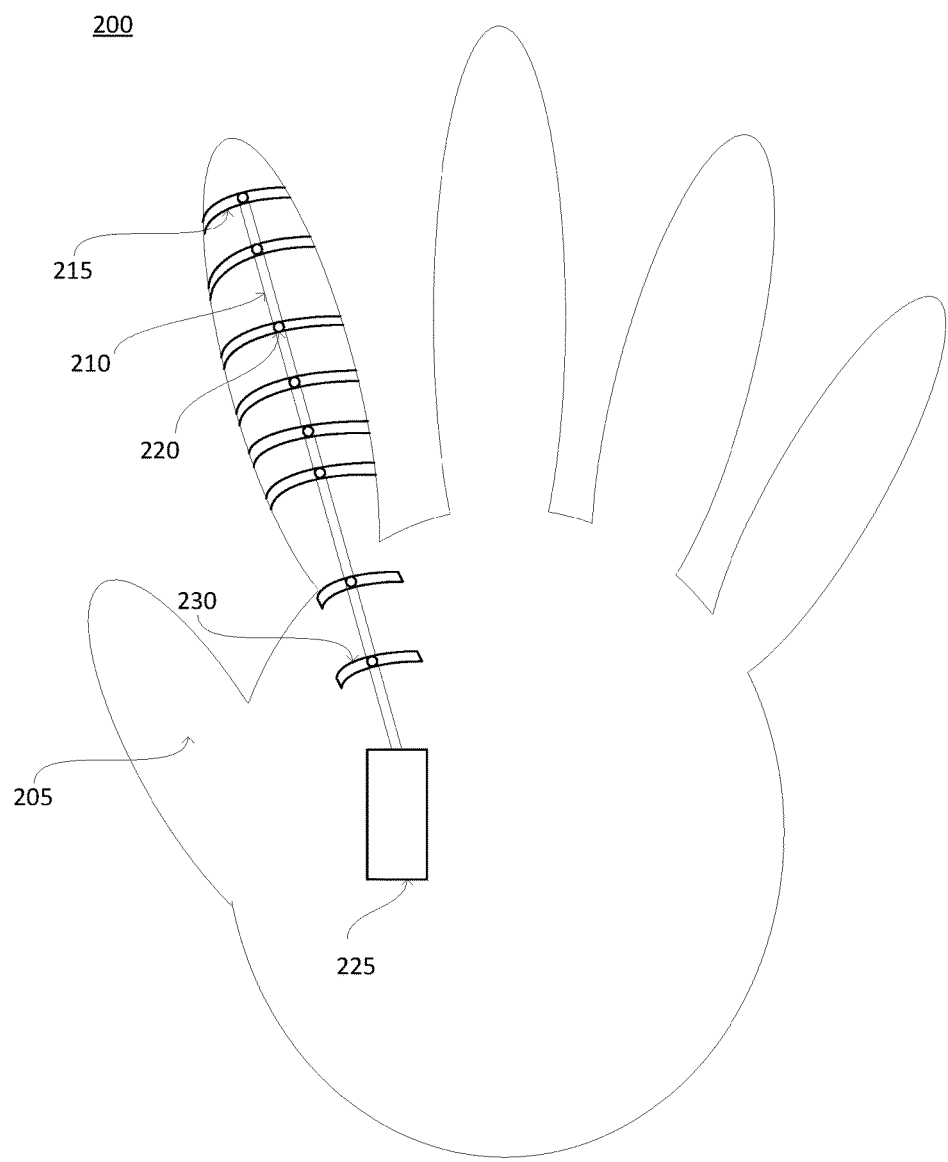
FIG. 2 illustrates a plan view of a tendon system that includes a tendon and an actuator attached to a garment, in accordance with an embodiment.

FIG. 2 illustrates a plan view of a tendon system 200 that includes a tendon 210 and actuator 225 attached to a garment 205, in accordance with an embodiment. The tendon system further includes rigid portions 215 attached to the garment 205 and anchors 220, which mechanically couple the tendon 210 to the rigid portions 215. An anchor 220 constrains lateral movement of the tendon 210 relative to a corresponding rigid portion 215, but the tendon 210 may slide longitudinally relative to the anchor 220 and rigid portion 215. The rigid portions 215 are mechanically coupled to the garment 205 to distribute force applied by the tendon 210 over areas of the garment rather than as point forces at the anchors 220. The actuator 225 is mechanically coupled to the tendon 210 to linearly push or pull the tendon 210. Alternatively or additionally, another activation mechanism applies force to the tendon 210. The tendon system 200 may include further tendons 210 driven by additional actuators 225 to apply force to additional rigid portions 215 coupled to the additional tendons by additional anchors 220. The additional tendons 210 may act on both sides of a user's joints to apply forces to flex or extend portions of the user's body (e.g., fingers).

The garment 205 may be any item of clothing that conforms to a portion of the user's body. For example, the garment 205 is a full-fingered glove wearable on the user's hand. The garment 205 typically includes a textile fabric, but it may also include other materials such as rubber, leather, fur, a polymer, or a combination thereof. The garment 205 may include multiple layers. For example, the tendon 210, rigid portions 215, anchors 220, and actuator 225 are enclosed between two layers of the garment 205. The garment 205 includes rigid portions 215 attached to various portions of the garment. A rigid portion 215 typically conforms to a portion of the user's body and may be any material more rigid than the garment 205. For example, a rigid portion 215 forms an arc around half of a user's finger. Alternatively or additionally to including rigid portions 215, the garment 205 includes textile meshes (described further with respect to FIGS. 4A-4C). An anchor 220 may be a hole formed through a rigid portion 215 or may be formed by a loop attached to the rigid portion 215. For example, the anchor 220 is a metal ring having a diameter greater than the tendon 210. The tendon 210 may typically slip longitudinally relative to the anchor 220, but an end of the tendon 210 may also be longitudinally fixed to an anchor 220 (referred to as a terminal anchor). Alternatively or additionally, the anchor 220 is a cylindrical housing enclosing the tendon 210 and fixed relative to the garment 205 or rigid portion 215, such as in a Bowden cable.

The tendon 210 may be any material to translate force from the actuator 225. For example, the tendon 210 is a wire, string, rod, other rigid structure, or an elastic structure. As another example, the tendon 210 includes a tendon web (described further with respect to FIG. 3) or variable width elements (described further with respect to FIGS. 5A-6). In some embodiments, the tendon 210 may also exert or resist a lateral force to jam an adjacent portion of the user's body. The actuator 225 applies a linear force to the tendon 210 to linearly translate an end of the tendon 210 mechanically coupled to the actuator 225. Example actuators 225 may include a solenoid mechanism (described further with respect to FIGS. 7A-8B), another magnetic mechanism, a hydraulic mechanism, a pneumatic mechanism, a piezoelectric mechanism, or a combination thereof. The actuator 225 is anchored to the garment 205 in the illustrated embodiment, but it may also be anchored to another element fixed relative to the user's body. Alternatively or additionally, the tendon 210 includes a flexible shaft which translates a rotary motion applied by actuator 225. If the actuator 225 rotates one end of a tendon having a fixed opposite end, the actuator 225 may modify the stiffness of the tendon 210.

When the actuator 225 pulls the tendon 210, the tendon exerts a force on the anchors 220, which exert a distributed force on the garment 205 through the rigid portions 215. As a result, the garment 205 torques portions of the body toward the actuator 225. If the user exerts muscles to resist the torque around the joint, the garment 205 remains stationary. If the user's muscles do not exert enough force to counter the torque around the joint, the tendon 210 pulls the portion of the user's body toward the actuator 225 by pulling the anchors 220 closer to the actuator 225 and closer to each other. For example, if an actuator 225 on the back of a user's hand pulls a tendon 210 on the back of a user's finger, the actuator 225 causes the garment 205 to either resist flexion of the finger or cause extension of the finger. Conversely, an actuator on the palm of a user's hand may pull a tendon 210 on the front of a user's finger to either resist extension of the finger or cause flexion of the finger. The actuator 225 may exert a variable force on the tendon 210 to cause a variable torque around the user's joint.

Networked Tendon Web

Figure 3:
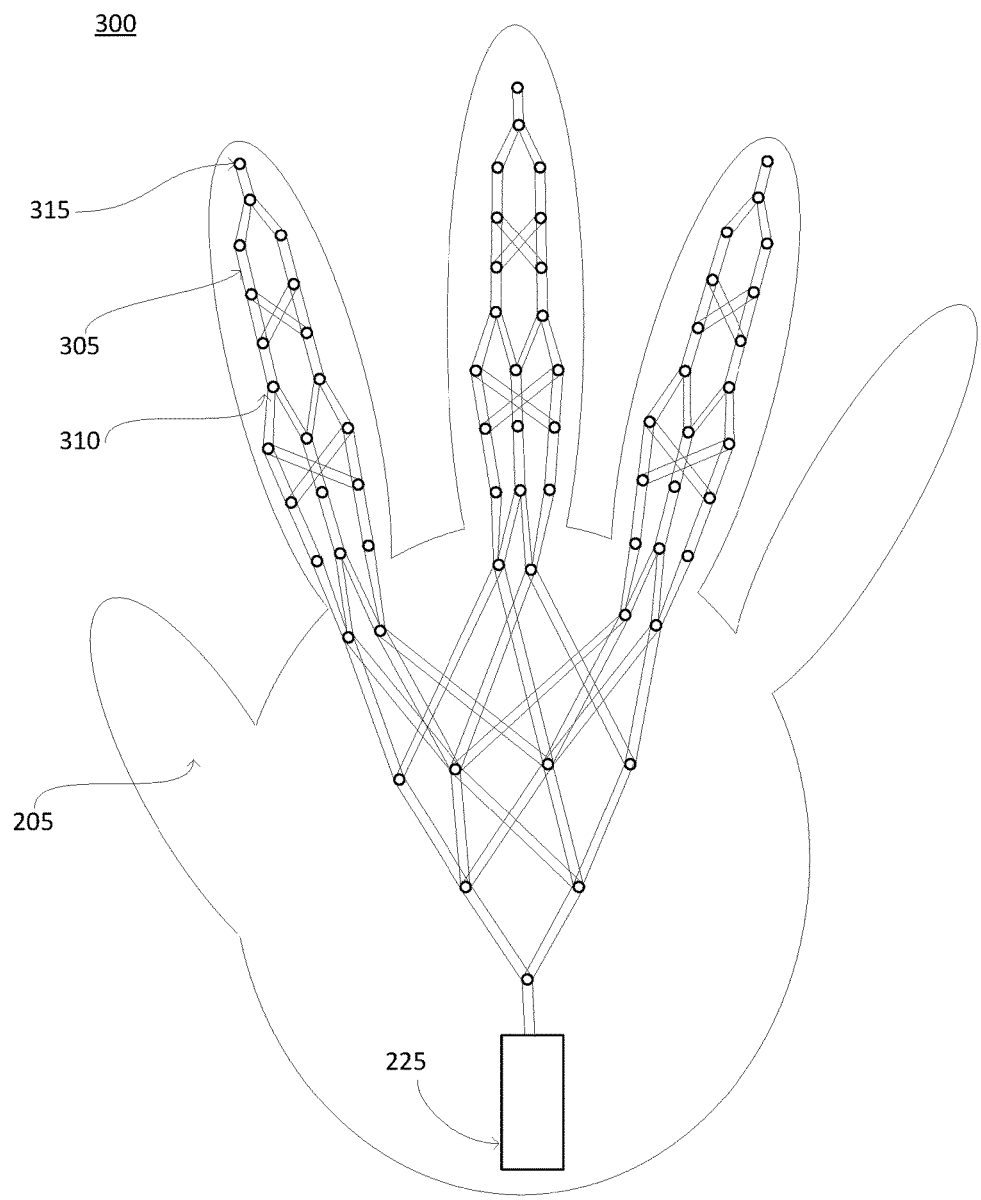
FIG. 3 illustrates a plan view of a tendon system that includes a tendon web, in accordance with an embodiment.

FIG. 3 illustrates a plan view of a tendon system 300 that includes a tendon web, in accordance with an embodiment. The tendon system 300 includes a tendon web comprising tendon segments 305, which are loosely fixed to the anchors 310 attached to the garment 205. Such anchors 310 may permit longitudinal movement by the tendon segments 305 but restrict lateral movement of the tendon segments 305. Some tendon segments 305 are fixed to terminal anchors 315 that constrain lateral and longitudinal movement of the end of an attached tendon segment 305. The tendon web is mechanically coupled at one end to actuator 225.

When the actuator 225 pulls on the end of the tendon web, the force from the actuator 225 propagates through the tendon segments 305 to exert a force on the garment 205 through the anchors 310 and 315. The tendon web has nodes where tendon segments 305 are connected to each other, so the tension force propagates to multiple tendon segments 305. The tendon web includes a root node where the tendon web is mechanically coupled to the actuator 225 as well as leaf nodes where terminal anchors 315 fix tendon segments 305 to a distal end of the garment 205. At an intermediate node, a tendon segment 305 may branch into multiple tendon segments 305 to increase the lateral width of the web as the web proceeds distally from the actuator 225 to the terminal anchors 315. Multiple tendon segments 305 may also meet at an intermediate node and connect to fewer tendon segments 305 to decrease the lateral width of the web as the web nears a terminal anchor 315.

The web of tendons beneficially reduces the number of actuators 225 to control tendons in the garment 205, which beneficially reduces the overall weight and power consumption of the haptic feedback mechanism 142. When a single tendon is connected to actuator 225, the tendon applies force to the garment at the anchors 310 and the points between the anchors 310 along the axis of the tendon. The tendon web beneficially includes tendon segments 305 that cross diagonally between anchors 310, so the tendon web distributes force to areas between laterally adjacent anchors 310. Accordingly, the tendon web improves realism and decreases user discomfort. The tendon web may also obviate the use of rigid portions 215, further reducing the overall weight and thickness of the haptic feedback mechanism 142.

The tendon segments 305 are formed from any material used to form tendons 210. The tendon segments 305 may be fixed to each other rigidly at nodes to permit no movement between the ends of the tendon segments 305. For example, the tendon segments 305 are knotted together or are formed as an integral mesh. Alternatively or additionally, an end of a tendon segment 305 may have partial mobility relative to another connected tendon segment 305. For example, an end of a mobile tendon segment 305 is knotted to the middle of another tendon segment 305 to allow longitudinal movement with respect to the other tendon segment 305 but to fix the mobile tendon segment 305 laterally with respect to the other tendon segment 305. In this example, the end of the mobile tendon segment 305 may be constrained to move between two knots or other stoppers along the length of the other tendon segment 305.

The anchors 310 are directly attached to the garment 205. Otherwise, the anchors 310 are similar to the anchors 220. For example, the anchors 310 are holes formed in the fabric of the garment in the plane of the tendon segments rather than rigid loops in some embodiments.

Textile Meshes

Figure 4A:
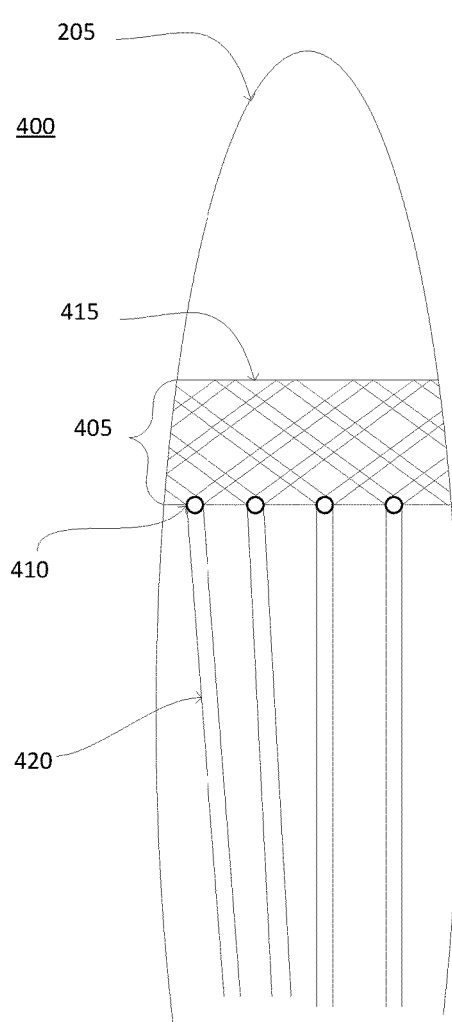
FIGS. 4A-4C illustrate plan views of tendon systems that include textile meshes, in accordance with various embodiments.
Figure 4B:
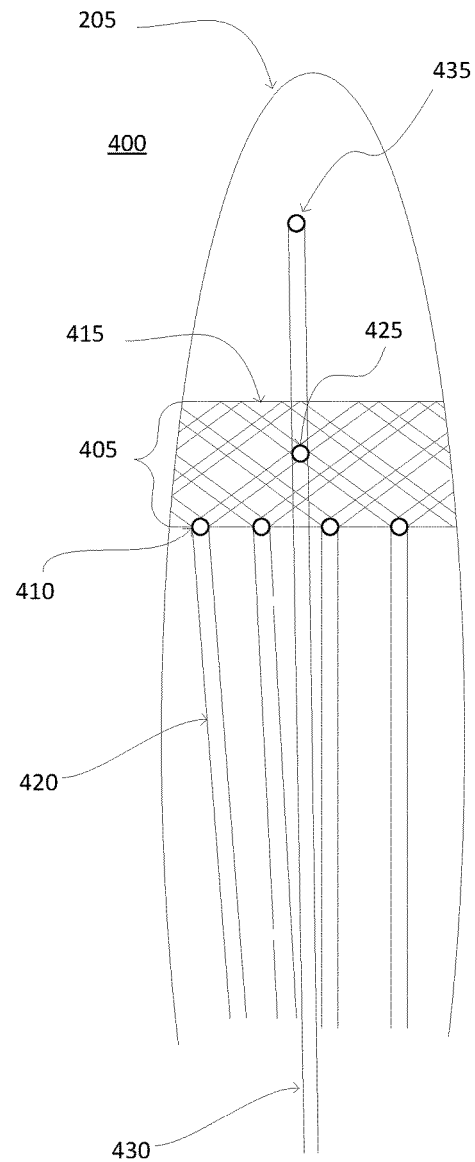
Figure 4C:
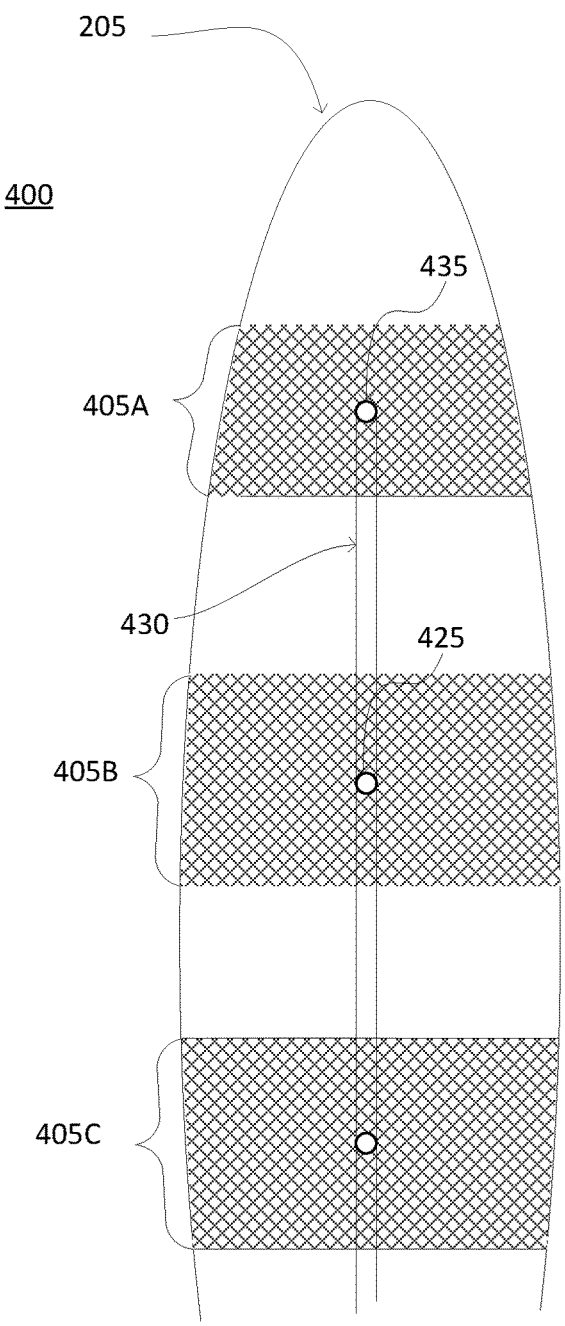

FIGS. 4A-4C illustrate plan views of tendon systems 400 that include textile meshes 405, in accordance with various embodiments. A textile mesh 405 includes a network or lattice of textile segments to distribute force exerted by a tendon through the garment 205. A textile segment may be a thread or string made of a natural material (e.g., cotton, hemp) or synthetic material (e.g., nylon, polyester). In the embodiment of FIG. 4A, the textile segments are attached at their upper ends to the garment 205 along seam 415. The connectors 410 attach the lower ends of the textile segments to control wires 420. The connectors 410 between the textile segments and the control wires 420 may be knots or rigid elements. Alternatively, the control wires 420 are integrally formed with the ends of the textile segments to obviate the connectors 410.

The textile mesh 405 may be enclosed between two layers of the garment 205 to prevent friction on the user's skin. The textile segments may be anchored to each other, to the garment 205, or both. When textile segments are attached, the connection may restrict movement along both attached segments or along only one of the text segments. For example, the connection is a loop attached to one textile segment that allows another textile segment to slide through the loop. The textile mesh 405 beneficially reduces the thickness of the contact interface between the tendon and the garment 205 compared to the rigid portions 215.

When the control wires 420 pull on the connectors 410, the textile mesh 405 elongates along the axis of the control wires 420 while exerting a compressive force on the garment 205 and a portion of the user's body inside the garment. As one or more actuators 225 apply a varying amount of force to the control wires 420, the textile mesh 405 applies a variable amount of radial compressive force to the enclosed portion of the user's body. Also, the stiffness of the textile mesh 405 increases as the control wires 420 apply more force. Different control wires 420 may apply different amounts of force in order to apply variable pressure to different portions of the user's body. Applying different forces with different control wires 420 results in variable stiffness at different portions of the textile mesh 405 connected to the different control wires 420. Thus, the textile mesh 405 can be considered a programmable textile configured by the control wires 420.

FIG. 4B illustrates a tendon system 400 in which an anchor 425 connects the textile mesh 405 to a tendon 430. The anchor 425 constrains at least lateral motion of the tendon 430 relative to the textile mesh 405. Instead of a connection with an anchor 425, the tendon 430 may be connected to the textile mesh through a terminal anchor 435 that constrains longitudinal movement of the tendon 430 relative to the textile mesh 405. An actuator 225 applies force to the tendon 430 to flex or extend the portion of the user's body enclosed by the textile mesh 405 connected to the anchor 425. The tendon 425 may also apply torque to a joint adjacent the portion of the body enclosed by the textile mesh 405. Thus, the tendon 430 is similar to the tendons 210 described with respect to FIG. 2. However, the textile mesh 405 beneficially distributes the force applied by the tendon over a larger portion of the user's body than do the rigid portions 215, so the textile mesh 405 beneficially reduces user discomfort from stress concentrations and friction.

The tendon 430 operates in concert with the control wires 420 to convey tactile sensations from a virtual reality environment using the textile mesh 405. For example, when the user holds a virtual object, control wires 420 apply a tensile force to a textile mesh 405 over an inner portion of the user's fingers to simulate contact between this portion of the user's fingers and the virtual object. Meanwhile, a tendon 430 applies a force to constrain the user's fingers from flexing past a simulated contour of the virtual object. As another example, as a user pushes on a virtual object, a control wire 420 applies a tensile force so that the textile mesh 405 simulates friction from the virtual object while a control wire 430 applies a force to extend the user's fingers to conform to a simulated contour of the virtual object.

FIG. 4C illustrates a tendon system 400 including multiple textile meshes 405A-405C (generally, textile meshes 405). A terminal anchor 435 connects an end of tendon 430 to textile mesh 405A. Other anchors 425 connect the tendon 430 to textile meshes 405B and 405C. The different textile meshes 405 are connected to distinct sets of control wires 420 (not illustrated). Accordingly, the distinct sets of control wires 420 may apply different forces to the different textile meshes 405A-405C, resulting in different pressures on the enclosed portion of the user's body. The distinct sets of control wires 420 may also cause the different textile meshes 405 to have different amounts of stiffness by applying different forces to the textile meshes 405 through connectors 410.

In the illustrated embodiment, the garment 205 encloses a finger on a user's hand. Each textile mesh 405 encloses a bone of the finger, and the spaces between the textile meshes correspond to knuckles. However, other configurations of the textile meshes 405 are possible. A textile mesh 405 may wrap only partway around a finger (or other portion of the user's body). For example, the garment tendon system 400 includes one textile mesh 405 for the front of the user's finger and another textile mesh 405 for the back of the user's finger. In this configuration, the textile mesh 405 may apply pressure to only the part of the finger in simulated contact with a virtual object.

Variable Width or Thickness Tendon

Figure 5A:
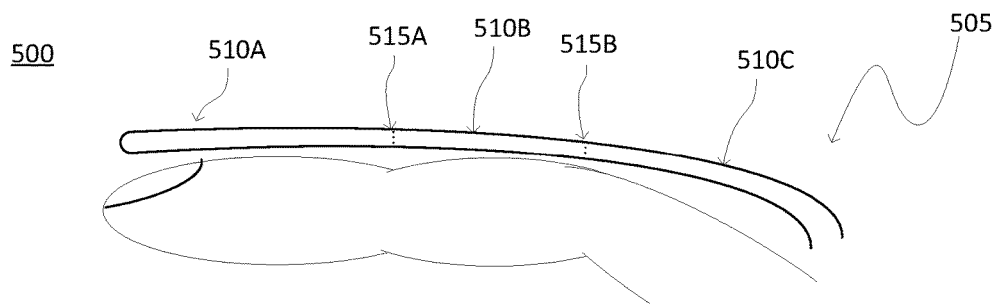
FIGS. 5A and 5B illustrate a cross-sectional view and a plan view, respectively, of a tendon system that includes a variable width tendon, in accordance with an embodiment.
Figure 5B:
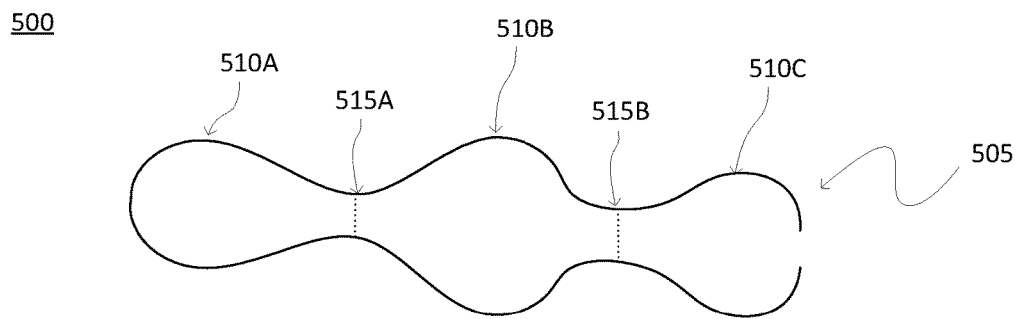

FIGS. 5A and 5B illustrate a cross-sectional view and a plan view, respectively, of a tendon system 500 that includes a variable width tendon 505, in accordance with an embodiment. The variable width tendon 505 includes a distal section 510A, a middle section 510B, and a proximal section 510C (generally, the sections 510). A distal connector 515A connects the distal section 510A and middle section 510B, and a proximal connector 515B connects the middle section 510B and the proximal section 510C. As illustrated in FIG. 5B, the sections 510 are horizontally wider than the connectors 515A and 515B (generally, the connectors 515). In other words, the variable width tendon 505 tapers at the connectors 515 and broadens towards the middle of the sections 510.

A garment 205 (not shown) secures the variable width tendon 505 in place relative to a portion of the user's body (in this case a finger). The garment 505 aligns the narrower connectors 515 with the joints in an adjacent portion of the user's body and aligns the wider sections 510 with more rigid portions of the user's body. For example, the sections 510 each correspond to a bone in the user's body, and the connectors 515 correspond to the joints between those bones.

An actuator 225 (not shown) may push or pull on the variable width tendon 505 to exert a torque on joints of the user's body or to flex or extend the portion of the user's body. Because the narrower connectors 515 are aligned with the user's joints, the variable width tendon 515 is more flexible near the user's joints than between the user's joints. Thus, the tendon may be wider overall and conform to a larger area of the user's skin using the wider sections 510, while the tendon may remain bendable near the user's joints due to the lower stiffness of the connectors 515. Thus, the variable width tendon 505 improves realism with a wider form factor while remaining ergonomic due to reduced stiffness at the bendable connectors 515.

Figure 6:
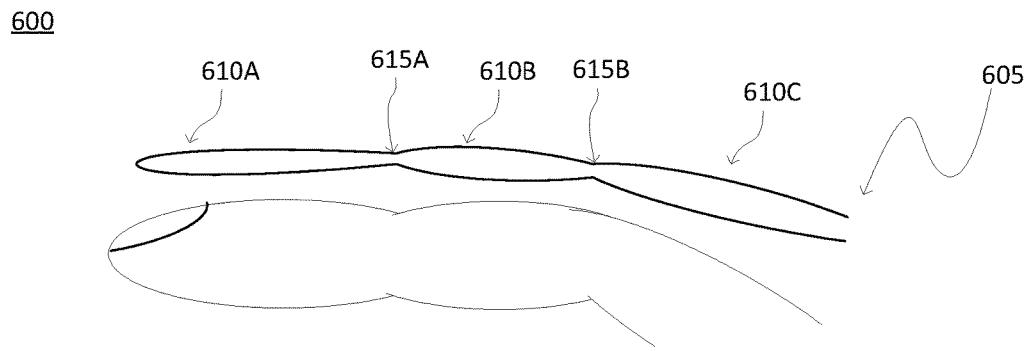
FIG. 6 illustrates a cross-sectional view of a tendon system that includes a variable width tendon, in accordance with an embodiment.

FIG. 6 illustrates a cross-sectional view of a tendon system 600 that includes a variable width tendon 605, in accordance with an embodiment. The variable width tendon 605 includes a distal section 610A, a middle section 610B, and a proximal section 610C (generally, the sections 610). A distal connector 615A connects the distal section 610A and the middle section 610B, and a proximal connector 615B connects the middle section 610B and the proximal section 610C. The variable width tendon 605 is less thick at the connectors 615A and 615B than it is at the sections 610. The variable width tendon 605 may have a variable width profile (as illustrated in FIG. 5B), a constant width profile, or a monotonically tapering profile. A garment 205 (not shown) aligns the variable width tendon 605 with the joints of a user's body to achieve the same benefits described with respect to FIGS. 5A and 5B.

Solenoid Actuator

Figure 7A:
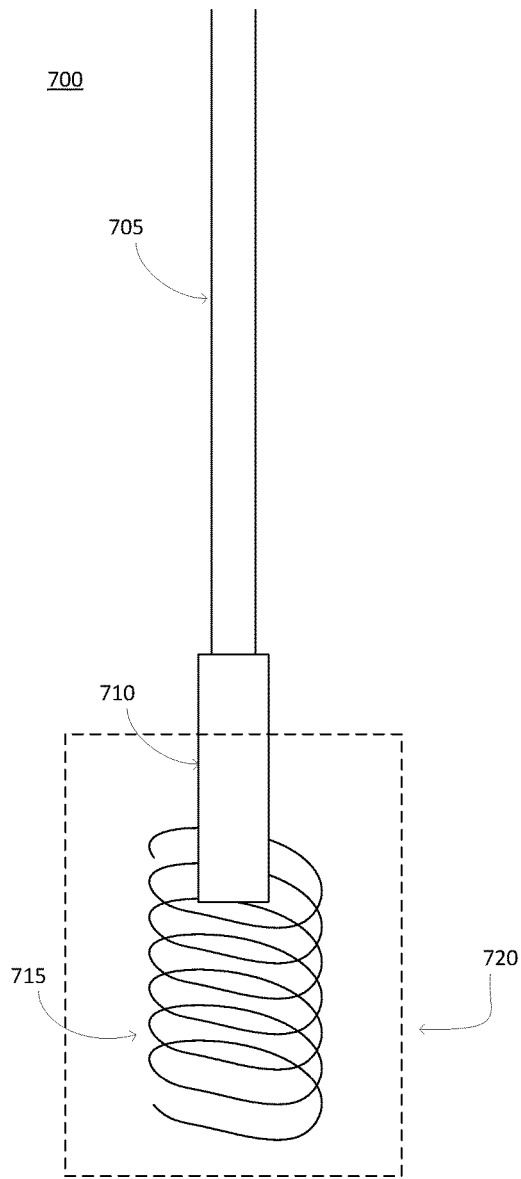
FIGS. 7A and 7B illustrate plan views of a tendon system that includes a solenoid actuator, in accordance with various embodiments.
Figure 7B:
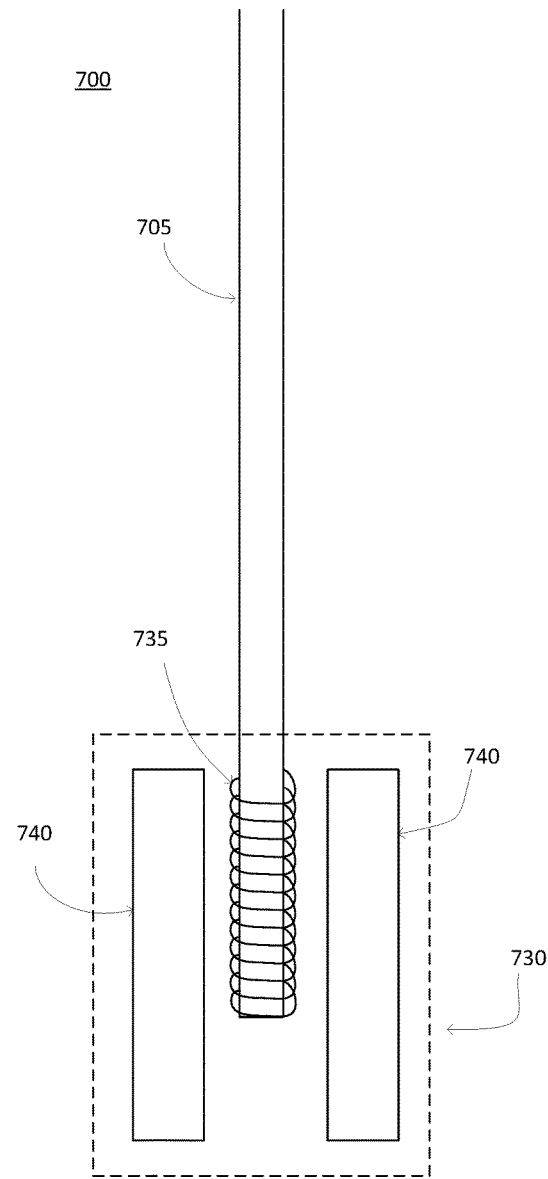

FIGS. 7A and 7B illustrate plan views of a tendon system 700 that includes a solenoid actuator 225, in accordance with various embodiments. In the embodiment of FIG. 7A, the tendon system 700 includes a solenoid actuator 720 and a tendon. The tendon includes a magnet 710 which is connected to an end of the tendon body 705. The tendon body 705 may be any of the tendons or tendon systems described with respect to FIGS. 2-6. The magnet 710 may be a permanent magnet such as a ferromagnetic core having high coercivity (e.g., ferrite). Alternatively, the magnet 710 is an electromagnet with a magnetic field generated by an electric current.

The solenoid actuator 720 includes a housing, a coiled wire 715, and a controller. The coiled wire 715 is fixed to the housing. The controller translates inputs from the communication interface 146 into an electrical current through the coiled wire 715 to generate a magnetic field. Because the coiled wire 715 conducts the current in a helical shape, the coiled wire 715 generates a magnetic field substantially parallel (or anti-parallel) to the center axis of the coiled wire 715 inside the coiled wire 715. The solenoid actuator 720 may push or pull on the tendon body 705 by attracting or repelling the magnet 710 using the induced magnetic field inside the coiled wire 715. By providing a varying amount of current to the coiled wire 715, the controller of the solenoid actuator 720 may vary the magnetic field exerted on the magnet 710 and therefore the force on the tendon body 705. By reversing the direction of the current to the coiled wire 715, the solenoid actuator 720 may switch from pulling the tendon to pushing the tendon. The solenoid actuator 720 may apply force to actively cause the tendon to move a portion of the user's body, or the solenoid actuator 720 may apply force so that the tendon system passively resists movement by a portion of the user's body. The controller 720 may include sensors to measure force on the tendon, the position of the tendon, or both.

Alternatively or additionally, the solenoid actuator 720 includes a spring to provide a restoring force on the tendon body 705 or magnet 710 when no current is applied to the coiled wire 715. For example, the solenoid actuator 720 pulls on the tendon when the controller applies current to the coiled wire 715, and a spring pushes the tendon to a default position when the controller applies no current.

In the embodiment of FIG. 7B, the solenoid actuator 730 includes a magnet 740, a housing, and controller. The magnet 740 is fixed to the housing. The tendon includes a tendon body 705 and a coiled wire 735. The magnet 740 may be a permanent magnet having the shape of a cylindrical shell or some other hollow shell shape open on at least one end. The coiled wire 735 is mechanically attached around an end of the tendon body 705 and is electrically connected to the controller of the solenoid actuator 730. The controller of the solenoid actuator 730 may apply a current to the coiled wire 735 to generate a magnetic field that pushes or pulls the tendon body 705 due to interactions with the magnetic field of the magnet 740. The solenoid actuator 740 may apply an active force to move the tendon or a passive force so that the tendon resists movement.

Figure 8A:
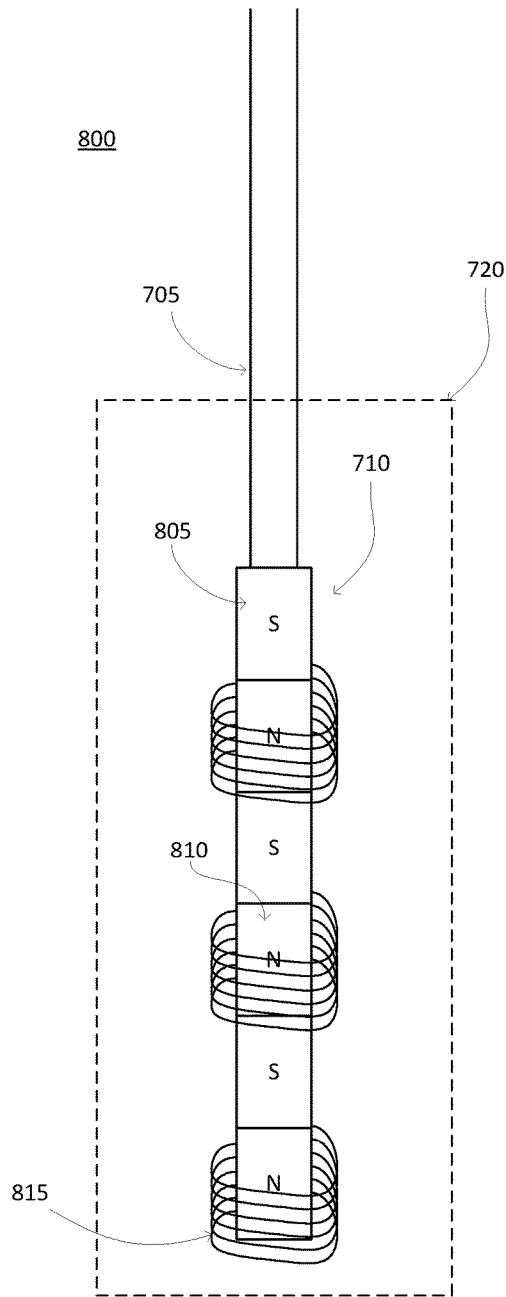
FIGS. 8A and 8B illustrate plan views of a tendon system that includes a solenoid actuator, in accordance with various embodiments.
Figure 8B:
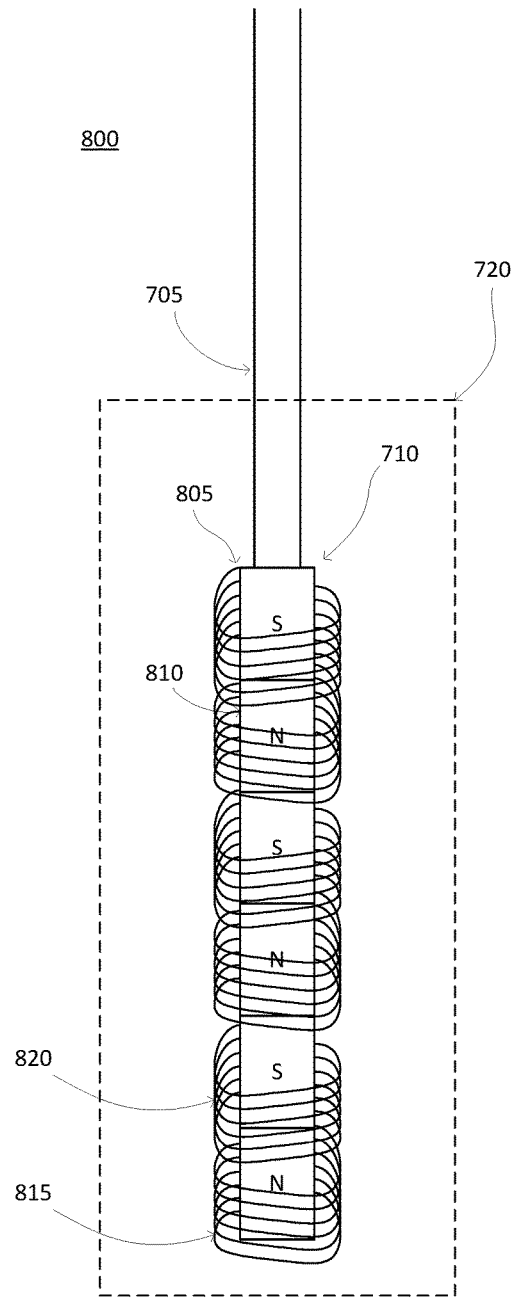

FIGS. 8A and 8B illustrate plan views of a tendon system 800 that includes a solenoid actuator 720, in accordance with various embodiments. The tendon includes a magnet 710 attached to an end of the tendon body 705. In the illustrated embodiment, the magnet 710 includes alternating north poles 810 and south poles 805. The magnet 710 includes a north pole 810 between successive south poles 805; the magnet 710 includes a south pole 805 between successive north poles 810. The alternating poles of the magnet 710 facilitate measurement of the position of the magnet 710 and tendon body 705. As the magnet 710 moves, a magnetic field detector may count oscillations in the direction of the magnetic field and combine the number of oscillations with a spacing of successive north or south poles to determine a total length moved by the magnet 710 and tendon body 705. Moreover, the alternating poles of the magnet 710 facilitate position control by providing a number of discrete stable positions for the magnet 710 and tendon body 705. By reducing the spacing between the alternating magnetic poles, the granularity of the tendon's stable positions increases.

In the embodiment of FIG. 8A, the solenoid actuator 720 includes multiple wire coils 815. The controller of the solenoid actuator 720 applies current in a same direction to each wire coil 815. Each wire coil 815 has a length corresponding to a length of a north or south pole segment of the magnet 710. The wire coils 815 are evenly spaced with a gap corresponding to the length of the opposite pole. In this way, the wire coils 815 collectively apply a magnetic field having a consistent direction, and the field from each wire coil 815 interacts with the local magnetic field from the poles enclosed by the wire coil 815 in a consistent manner. For example, as illustrated, each wire coil 815 may apply the same magnetic field to repel or attract the field from the north poles 810 under each wire coil 815.

In the embodiment of FIG. 8B, the solenoid actuator 720 includes a first set of wire coils 815 and a second set of wire coils 820 attached the housing. The controller of the solenoid actuator 720 applies current in one direction to the wire coils 815 and applies current in an opposite direction to the wire coils 820. Each wire coil 815 has a length corresponding to the length of either the north or south poles, and each wire coil 820 has a length corresponding to the length of the opposite set of poles. If the controller applies currents in one direction to the wire coils 815 and in an opposite direction to the wire coils 820, then the wire coils 815 generate a field having an opposite longitudinal direction from the field generated by the wire coils 820. The magnetic field from the magnet 710 has an opposite longitudinal direction at wire coils 815 relative to its direction at wire coils 820. Thus, the interactions between the alternating magnetic fields of the north and south poles 805 and 810 and the alternating magnetic fields form the wire coils 815 and 820 results in consistent longitudinal force on the magnet 710 in one direction. The wire coils 820 approximately double the force exerted on the magnet 710 and tendon body 705 relative to the embodiment illustrated in FIG. 8A.

Orientation-Dependent Feedback

Figure 9A:
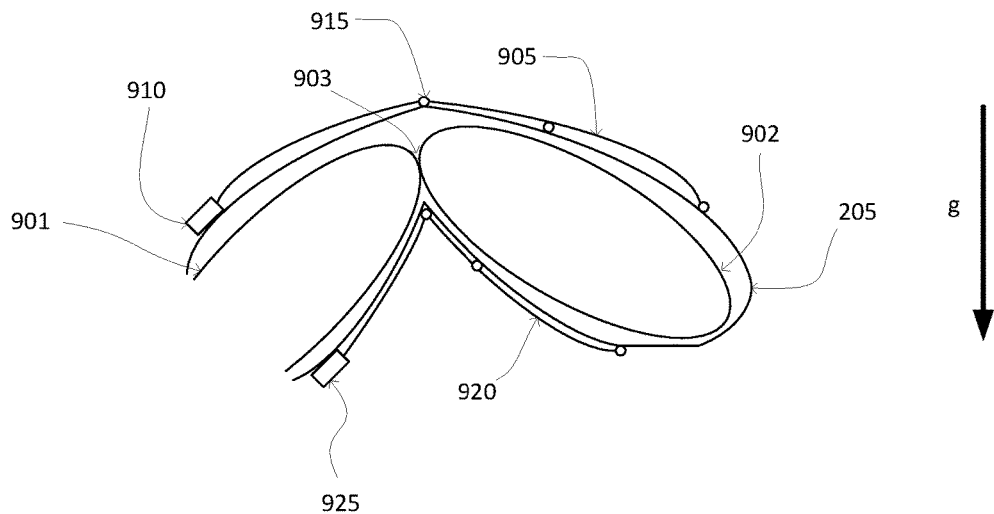
FIGS. 9A and 9B illustrate cross-sectional views of a tendon system that applies a torque to a joint according to the orientation of the joint, in accordance with an embodiment.
Figure 9B:
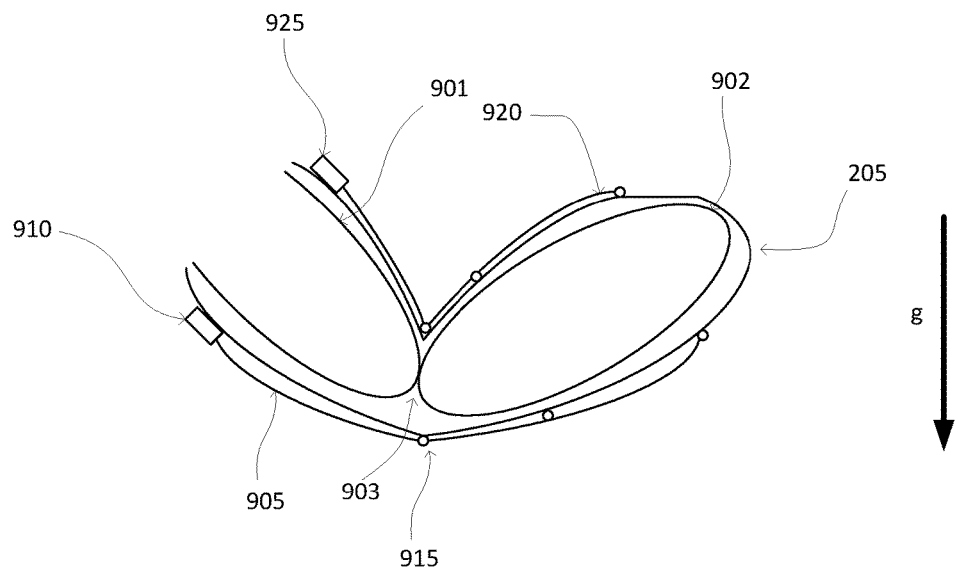

FIGS. 9A and 9B illustrate cross-sectional views of a tendon system 900 that applies a torque to a joint according to the orientation of the joint, in accordance with an embodiment. A garment 205 encloses body portion 901 (e.g., a forearm), body portion 902 (e.g., a hand), and a joint 903 (e.g., wrist) between the body portions 901 and 902. The tendon system 900 includes an upper actuator 910 that applies force to an upper tendon 905, which transmits the force to the garment 205 through the anchors 915. The tendon system 900 also includes a lower actuator 925 that applies force to a lower tendon 920, which transmits the force to the garment 205 through the anchors 915.

The haptic feedback system 142 uses the tendon system 900 to apply a torque to the joint 903 that varies with the orientation of the garment 205 and tendon system 900. An orientation sensor (e.g., accelerometer, magnetometer) attached to the garment 205 outputs an orientation of the garment 205 relative to gravity. The VR console 170 receives the orientation, and the VR engine 174 commands the haptic feedback mechanism 142 to vary torque applied based on the sensed orientation. For example, the tendon system 900 applies a torque having a consistent orientation (e.g., downward) relative to the user even as the orientation of the garment 205 changes.

FIGS. 9A and 9B illustrate two different orientations of the garment 205 relative to gravity. For example, in FIG. 9A, the hand is palm down, and in FIG. 9B, the hand is rotated so that the palm faces upward while the wrist maintains the same flexed angle. In FIG. 9A, lower actuator 925 pulls the lower tendon 920 to apply a flexing torque on the joint 903. This simulates, for example, the user holding a heavy virtual object. In FIG. 9B, lower actuator 925 relaxes the lower tendon 920, and upper actuator 910 applies an extending torque on the joint 903 by pulling on the upper tendon 905. Thus, even as the orientation of the garment 205 has changed, the changing torque on the joint 903 induces a perception of a consistent downward force on the body portion 902. Non-vertical directions of apparent force are possible as well. For example, the tendon system 900 applies a torque to simulate a horizontal force from a virtual wind.

While some of the preceding discussion of the embodiments refers to a virtual reality garment such as a glove that encloses a user's hand or figures, in other embodiments, the tendon systems described herein can be adapted to other types of garments that apply force to other parts of the body (e.g., elbows, torso, knees, or ankles).

Additional Configuration Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure.

What is claimed is:

1. A system comprising:
a console coupled to an electronic display in a head mounted display, the console configured to provide content to the electronic display for presentation to a user; and
a glove configured to be worn on a hand of the user and coupled to the console, the glove comprising:
a feedback mechanism including a tendon coupled to a portion of the glove, the tendon comprising:
a distal section coupled to a distal connector, the distal section having a width in a dimension that is wider than a width of the distal connector in the dimension;
a middle section coupled to the distal connector and to a proximal connector, the middle section having a width in the dimension that is wider than the width of the distal connector in the dimension and that is wider than a width of the proximal connector in the dimension; and
a proximal section coupled to the proximal connector, the proximal section having a width in the dimension that is wider than the width of the proximal connector in the dimension; and
an actuator coupled to the tendon, the actuator configured to tension the tendon to apply force to the portion of the glove coupled to the tendon in response to receiving information from the console.

2. The system of claim 1, wherein the feedback mechanism comprises an anchor configured to mechanically couple the tendon to the portion of the glove and to constrain lateral movement of the tendon relative to the portion of the glove.

3. The system of claim 2, wherein the anchor is configured to allow longitudinal movement of the tendon relative to the portion of the glove.

4. The system of claim 1, wherein the portion of the glove coupled to the tendon comprises a rigid portion of the glove.

5. The system of claim 1, wherein the glove includes multiple layers and the tendon and actuator are enclosed between two layers of the glove.

6. The system of claim 1, wherein the glove further comprises one or more sensors configured to determine an orientation of the glove relative to gravity and communicate the orientation of the glove to the console, and wherein the actuator is configured to receive commands from the console that vary tensioning of the tendon based on the determined orientation.

7. The system of claim 6, wherein the commands from the console that vary tensioning of the tendon modify tensioning of the tendon by the actuator to provide force to the portion of the glove having a consistent orientation relative to the user.

8. The system of claim 1, wherein the tendon comprises a magnet coupled to the end of the tendon and the actuator comprises a coiled wire through which an electrical current is applied in response to information from the console to induce a magnetic field that exerts a force on the magnet coupled to the end of the tendon.

9. The system of claim 8, wherein the actuator further comprises a spring configured to provide a restoring force to the magnet when the electrical current is not applied to the coiled wire.

10. The system of claim 1, wherein the actuator includes a magnet and the tendon comprises a coiled wire mechanically coupled to an end of the tendon and electrically coupled to the actuator, the actuator configured to apply a current to the coiled wire in response to information from the console to induce a magnetic field that exerts a force on the magnet included in the actuator.

11. The system of claim 1, wherein the feedback mechanism further includes:
a textile mesh coupled to the tendon and configured to distribute force applied by tensioning of the tendon.

12. The system of claim 1, wherein the textile mesh comprises a lattice of textile segments.

13. The system of claim 1, wherein the width of the distal section in the dimension increases as a distance from the distal connector increases.

14. The system of claim 1, wherein the width of the middle section in the dimension increases as a distance from the distal connector increases and decreases as a distance from the middle connector decreases.

15. A system comprising:
a console coupled to an electronic display in a head mounted display, the console configured to provide content to the electronic display for presentation to a user; and
a garment configured to contact one or more portions of a body of the user and coupled to the console, the garment comprising:
a tendon segment coupled to an anchor configured to mechanically couple the tendon segment to a portion of the garment and to constrain lateral movement of the tendon segment relative to the portion of the garment;
an additional tendon segment coupled to the anchor and to an additional anchor, the additional anchor configured to mechanically couple the tendon segment to an additional portion of the garment and to constrain lateral movement of the additional tendon segment relative to the additional portion of the garment
an actuator attached to an end of the tendon segment, the actuator configured to tension the tendon segment to apply force to the tendon segment and to the additional tendon segment.

16. The system of claim 15, wherein the end of the tendon segment comprises a magnet coupled to the end of the tendon segment and the actuator comprises a coiled wire through which an electrical current is applied in response to information from the console to induce a magnetic field that exerts a force on the magnet coupled to the end of the tendon segment.

17. The system of claim 16, wherein the actuator further comprises a spring configured to provide a restoring force to the magnet when the electrical current is not applied to the coiled wire.

18. The system of claim 15, wherein the actuator includes a magnet and a coiled wire is mechanically coupled to the end of the tendon segment and is electrically coupled to the actuator, the actuator configured to apply a current to the coiled wire in response to information from the console to induce a magnetic field that exerts a force on the magnet included in the actuator.

19. A system comprising:
a console coupled to an electronic display in a head mounted display, the console configured to provide content to the electronic display for presentation to a user; and
a garment configured to contact one or more portions of a body of the user and coupled to the console, the garment comprising:
a feedback mechanism including a tendon coupled to a portion of the garment, the tendon comprising:
a distal section coupled to a distal connector, the distal section having a width in a dimension that is wider than a width of the distal connector in the dimension;
a middle section coupled to the distal connector and to a proximal connector, the middle section having a width in the dimension that is wider than the width of the distal connector in the dimension and that is wider than a width of the proximal connector in the dimension; and
a proximal section coupled to the proximal connector, the proximal section having a width in the dimension that is wider than the width of the proximal connector in the dimension; and
an actuator, the actuator configured to tension the tendon to apply force to the portion of the garment coupled to the tendon in response to receiving information from the console.

20. The system of claim 19, wherein the feedback mechanism further includes:
a textile mesh coupled to the tendon and configured to distribute force applied by tensioning of the tendon.

* * * * *

UNITED STATES PATENT AND TRADEMARK OFFICE
CERTIFICATE OF CORRECTION

PATENT NO. : 10,025,387 B2
APPLICATION NO. : 15/372336
DATED : July 17, 2018
INVENTOR(S) : Sean Jason Keller et al.

Page 1 of 1

It is certified that error appears in the above-identified patent and that said Letters Patent is hereby corrected as shown below:

In the Claims

Column 13, Line 42, Claim 2, delete "laternal movement" and insert --lateral movement--.

Column 14, Line 2, Claim 8, delete "to the end" and insert --to an end--.

Signed and Sealed this
Fifth Day of March, 2019

Andrei Iancu
*Director of the United States Patent and Trademark Office*